Nov 24, 1953  W. F. KING  2,660,683
COMMUTATOR WITH SELF-WEDGING RETAINING RINGS
Filed April 16, 1951

Inventor
William F. King
by T. Loyd La Faue
Attorney

Patented Nov. 24, 1953

2,660,683

UNITED STATES PATENT OFFICE 2,660,683

COMMUTATOR WITH SELF-WEDGING RETAINING RINGS

William F. King, Wauwatosa, Wis., assignor to Allis-Chalmers Manufacturing Company, Milwaukee, Wis.

Application April 16, 1951, Serial No. 221,228

6 Claims. (Cl. 310—236)

This invention relates to commutators for dynamoelectric machines and particularly to commutators having retaining rings which are subject to axial pressure.

A commutator of this type, such as a V-ring, arch bound commutator, as heretofore constructed comprises a cylinder clamped together by means of steel V-shaped retaining rings which engage V-grooves in the ends of the copper commutator bars. The bars are insulated from each V-ring by a ring of mica disposed therebetween. A spring ring may be used to apply an axial pressure on the retaining rings. The radially inner surface of each V-groove and the adjacent surface of the V-ring have a common generatrix which forms an angle with the axis of the cylinder. Although it has been desirable to reduce this angle in order to reduce the required assembly pressure the spring rings must exert upon the retaining rings, this angle has remained, heretofore, an angle of about thirty degrees and always greater than the angle of friction for the engaged surfaces.

In such a commutator the retaining rings are intended to follow the movement of the bars with the contractions and expansions thereof due to heating and cooling. However, the rings of mica to be disposed between the bars and retaining rings have a substantial thickness for providing a resilient element in the commutator. The mica therefore tends to follow the movement of the bars while holding the retaining rings in place which is a self-destructive action which also causes the commutator cylinder to become out of round.

It is therefore an object of this invention to provide a V-ring commutator in which the V-rings minutely follow the commutator bars.

Another object of the invention is to provide a spring ring commutator in which the axial pressure required of the spring ring is substantially reduced.

Another object of the invention is to provide a V-ring commutator in which the time required for seasoning after assembly is substantially reduced.

Figure 1:
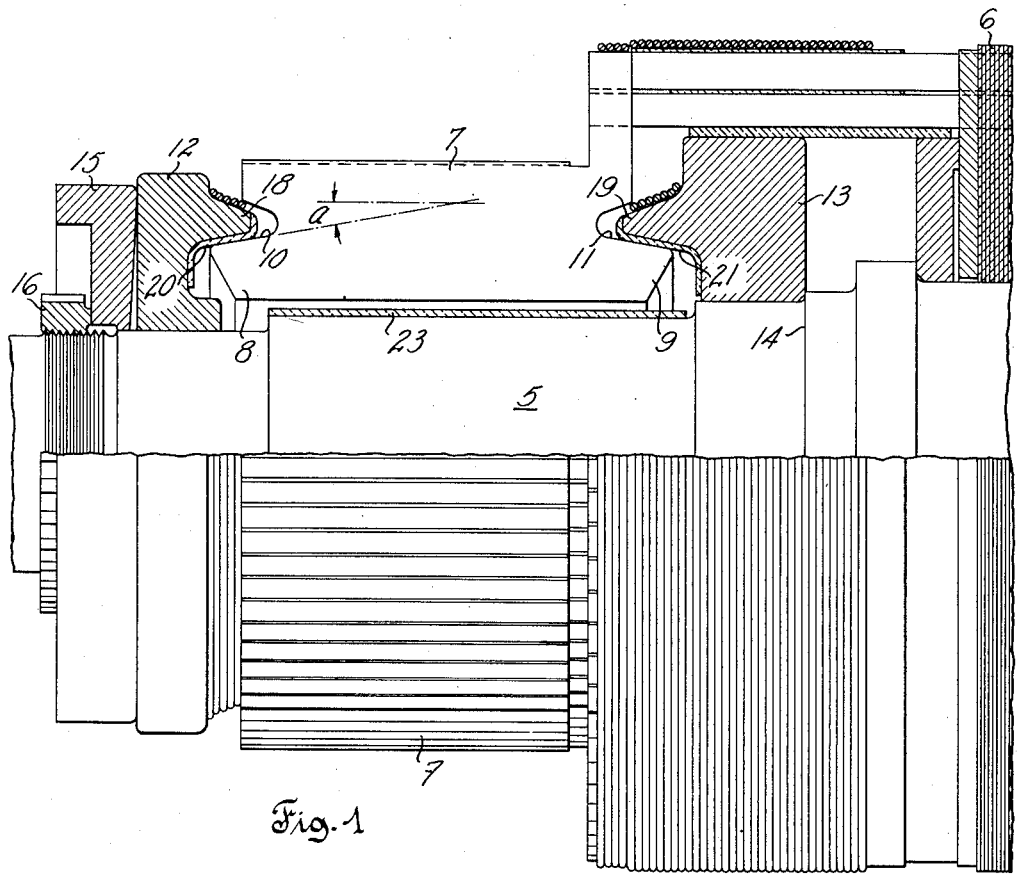
Figure 2:
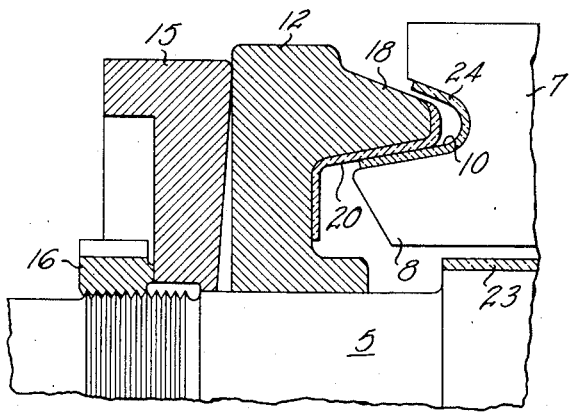

Other objects and advantages will be apparent from a consideration of the following description taken in connection with the accompanying drawings, in which:

Fig. 1 is a view partially in longitudinal cross section and partially in elevation of a commutator assembly embodying the present invention; and Fig. 2 is a partial view in longitudinal cross section of a modification of the embodiment shown in Fig. 1.

Referring to the drawing, Fig. 1 shows a commutator assembly comprising a commutator cylinder of the arch bound type mounted on a shaft 5 of a dynamoelectric machine having an armature 6 adjacent to the commutator.

The commutator cylinder comprises a plurality of bars 7 suitably insulated from each other by sheets of plate mica. Opposite ends of the bars have axial projections 8, 9 having conical surfaces 10, 11 of which the generatrix forms a predetermined acute angle "a" with the axis of the cylinder. Further axial projections of the bars may cooperate with projections 8, 9 to define V-grooves at both ends of the bars as shown, or may be omitted if desired. Retaining rings 12, 13 are mounted on the shaft and hold the bars 7 in arch bound relation. Ring 13 abuts a shoulder 14 on the shaft. Ring 12 is urged axially toward ring 13 by a suitable spring ring 15 held in position by an adjustable nut 16 in threaded engagement with the shaft 5.

Rings 12, 13, which may be of the V-ring type, have axial projections 18, 19 with inner conical surfaces 20, 21 comprising a smooth coating of an insulating material which may be baked on enamel but preferably consists of vitreous enamel which does not require seasoning after assembly of the commutator. The generatrices of the surfaces 20, 21 form the predetermined acute angle "a" with the axis of the cylinder. Surfaces 20, 21 of the V-rings engage the corresponding surfaces 10, 11 of the V-grooves to force the bars radially inward in arch binding relation with adjacent bars. The engaged surfaces of the V-rings and the V-grooves have an angle of friction which is relatively low, with respect to the angle of friction for the usual seasoned mica insulation between the V-ring and V-grooves.

For increasing the radial clamping pressure of the retaining rings 12, 13 on the bars 7 for a given axial pressure exerted by the spring ring 15, the acute angle "a" defined by generatrices of the engaged surfaces and the axis of the cylinder is made less than the angle of friction for the engaged surfaces. The angle "a" for the vitreous enameled V-rings may be taken in the range of five to fifteen degrees and preferably about ten degrees but less than the angle of friction for the engaged surfaces.

The commutator cylinder, being arch bound, has spacing between the bottom of the bars 7 and the shaft 5, and to avoid the possibility of short circuit therebetween for any reason the shaft is suitably insulated as with wrappings 23 of flexible mica and glass tape. Similarly, suitable insulation such as glass cord may be wound around the outer surfaces of the axial projections 18, 19 of the V-rings and painted with suitable enamel to insulate the rings from the outer portions of the bars and to prevent dirt entering the spaces of the V-grooves.

The commutator may be assembled in a well known manner. When assembled, the axial pressure applied to the retaining rings 12, 13 causes the axial projections 18, 19 thereof to wedge against the corresponding conical surfaces 10, 11 of the commutator bars securing the bars together in arch bound relationship. The retaining rings therefore follow every axial expansion and contraction of the bars due to temperature changes therein. The retaining rings remain wedged on ends of the bars because the engaged surfaces form with the axis of the commutator cylinder the angle "$a$" which is less than the angle of friction for the engaged surfaces. The retaining rings follow the axial contractions of the bars even if the contractions cause spring ring 15 to no longer exert axial pressure on the retaining rings. The commutator therefore combines the insensitiveness to temperature changes inherent in shrink ring bound commutators and the ease of assembly inherent in V-ring commutators.

The embodiment of the invention shown in Fig. 1 may be modified as shown in Fig. 2, wherein the V-grooves 10, 11, of the commutator bars 7 have disposed therein between the vitreous enamel surface of the V-rings and the surfaces of the bars, an insulating ring formed of a relatively thin layer of mica 24. The angle "$a$" that the generatrix of the engaged surfaces defines with the axis of the cylinder being preferably an angle of about ten degrees and less than the angle of friction for either the mica splittings and the binder within the mica ring or for the engaged surfaces comprising the vitreous enameled V-ring surface and the V-groove of the bars with the ring of mica therein.

Although but two embodiments of the present invention have been shown and described, it will readily be apparent to one skilled in the art that various changes and modifications may be made therein without departing from the spirit of the invention or from the scope of the appended claims.

It is claimed and desired to secure by Letters Patent:

1. A commutator cylinder comprising a plurality of commutator bars each having an inclined surface at one end, insulation disposed between adjacent said bars, a retaining ring having an inclined surface of electrically nonconductive rigid material which bears directly against said inclined surfaces of said bars, the common generatrix of said inclined surfaces forming with the axis of said cylinder an angle which is less than the angle of friction for said surfaces, and means forcing said ring axially against said inclined end surfaces of said bars to cause said bars to move radially inward while bearing against adjacent bars through said insulation, said rings wedging themselves on said bars so as to follow all axial movements of said bars for maintaining clamping pressure thereon.

2. A commutator cylinder comprising a plurality of commutator bars each having an inclined surface at each end, insulation disposed between adjacent said bars, two retaining rings having inclined surfaces of electrically nonconductive rigid material which bear directly against said inclined surfaces of said bars, each said ring engaging a different end of said bars, the common generatrix of said bar and ring inclined surfaces at each end of said bars forming with the axis of said cylinder an angle which is less than the angle of friction for said surfaces, and means forcing said rings axially against said inclined end surfaces of said bars to cause said bars to move radially inward while bearing against adjacent bars through said insulation, said rings wedging themselves on said bars so as to follow all axial movements of said bars for maintaining clamping pressure thereon.

3. A commutator cylinder comprising a plurality of commutator bars each having an inclined surface at each end, insulation disposed between adjacent said bars, two retaining rings having inclined surfaces which bear directly against said inclinded surfaces of said bars, each of said rings engaging a different end of said bars, said inclined surfaces of said rings having a coating of an electrically nonconductive vitreous material, and means forcing said rings axially against said inclined surfaces of said bars to cause said bars to move radially inward while bearing against adjacent said bars through said insulation, the common generatrix of said bar and ring inclined surfaces at each end of said bars forming with the axis of said cylinder an angle which is less than the angle of friction for the engaged said surfaces so that each ring wedges itself upon said bars so as to follow all axial movements of said bars and maintain clamping pressure on said bars when said forcing means becomes inoperative.

4. A commutator cylinder comprising a plurality of commutator bars each having an inclined surface at each end, insulation disposed between adjacent said bars, two retaining rings having inclined surfaces which bear directly against said inclined surfaces of said bars, each of said rings engaging a different end of said bars, said retaining ring surfaces comprising vitreous enamel to electrically insulate said rings from said bars, and means forcing said rings axially against said inclined surfaces of said bars to cause said bars to move radially inward while bearing against adjacent said bars through said insulation, the common generatrix of said bar and ring inclined surface at each end of said bars forming with the axis of said cylinder an angle which is less than the angle of friction for said inclined surfaces so that each said ring wedges itself upon said bars so as to follow all axial movements of said bars.

5. A commutator cylinder comprising a plurality of commutator bars each having an inclined surface at each end, insulation disposed between adjacent said bars, retaining rings having inclined surfaces which bear directly against said inclined surfaces at each end of said bars, said inclined surfaces of said rings having a coating of vitreous enamel to electrically insulate said rings from said bars, and means forcing said rings axially against said inclined surfaces of said bars to cause said bars to move radially inward while bearing against adjacent said bars through said insulation, the common generatrix of said bar and ring inclined surfaces at each end of said bars forming with the axis of said cylinder an angle within the range of five to fifteen degrees and less than the angle of friction for said inclined surfaces so that each said ring wedges itself upon said bars so as to follow all axial movements of said bars.

6. A commutator cylinder comprising a plurality of commutator bars having an axial V-groove at each end, insulation disposed between adjacent said bars, V-rings for retaining the ends of said bars with one said V-ring at each end of said bars, the bar bearing surfaces of said V-rings having a coating of vitreous enamel for electrically insulating said rings from said bars, and means forcing said rings axially against the radially inner surfaces of said V-grooves to cause said bars to move radially inward while bearing against adjacent said bars through said insulation, the bearing surfaces of said V-grooves and of said V-rings at each end of said bars forming with the axis of said cylinder an angle which is less than the angle of friction for said surfaces so that said V-rings wedge themselves on said bars so as to follow all axial movement thereof.

WILLIAM F. KING.

References Cited in the file of this patent

UNITED STATES PATENTS

| Number | Name | Date |
| --- | --- | --- |
| 453,858 | Davis | June 9, 1891 |
| 526,742 | Reist | Oct. 2, 1894 |
| 747,873 | Erben | Dec. 22, 1903 |
| 2,060,480 | Arnold | Nov. 10, 1936 |
| 2,141,268 | Dunbar | Dec. 27, 1938 |
| 2,426,042 | Mueller | Aug. 19, 1947 |